US012769099B2

(12) United States Patent
Jiang et al.

(10) Patent No.: US 12,769,099 B2
(45) Date of Patent: Oct. 20, 2026

(54) FIXED FOCUS PROJECTION LENS

(71) Applicant: SUN YANG OPTICS DEVELOPMENT CO., LTD., Taoyuan City (TW)

(72) Inventors: Sheng Da Jiang, Taoyuan City (TW); Yu Hung Chou, Taoyuan City (TW); Sheng Che Wu, Taoyuan City (TW)

(73) Assignee: SUN YANG OPTICS DEVELOPMENT CO., LTD., Taoyuan City (TW)

( * ) Notice: Subject to any disclaimer, the term of this patent is extended or adjusted under 35 U.S.C. 154(b) by 195 days.

(21) Appl. No.: 18/896,163

(22) Filed: Sep. 25, 2024

(65) Prior Publication Data

US 2026/0086337 A1 Mar. 26, 2026

(51) Int. Cl.
*G02B 13/16* (2006.01)
*G02B 13/00* (2006.01)

(52) U.S. Cl.
CPC ......... *G02B 13/16* (2013.01); *G02B 13/0045* (2013.01); *G02B 13/0055* (2013.01)

(58) Field of Classification Search
CPC . G02B 13/16; G02B 13/0045; G02B 13/0055
See application file for complete search history.

(56) References Cited

U.S. PATENT DOCUMENTS

2024/0019692 A1* 1/2024 Shiota ................ G02B 13/0045

* cited by examiner

*Primary Examiner* — James A Dudek
(74) *Attorney, Agent, or Firm* — Birch, Stewart, Kolasch & Birch, LLP

(57) ABSTRACT

A fixed focus projection lens, from the magnifying side to the narrowing side of the lens sequentially comprising: a front lens group and a rear lens group, the front lens group has 8 to 11 lenses, the front lens group has a front aspherical lens, the rear lens group has 8 to 11 lenses, the rear lens group has a rear aspherical lens, for satisfying 1.5<|fa/f|<3 and 4<Bf/f<5, f is the focal length of the system, fa is the focal length of the front lens group from the first lens to the fifth lens, Bf is the rear focal length obtained by air conversion, the rear lens group has an aperture.

8 Claims, 6 Drawing Sheets

FIXED FOCUS PROJECTION LENS

BACKGROUND OF THE INVENTION

1. Field of the Invention

The present invention relates to a fixed focus projection lens, particularly to one that reduces the number of the lens group and the aspherical lense, and maintain the quality of projection imaging.

2. Description of the Related Art

Projectors continue to innovate with the advancement of technology, and their wide range of applications also show the value of projectors in the market, including products in multimedia information presentation systems, projection TVs, home cinemas, video conferencing and other fields; Wherein, although the zoom projection lens can easily adjust the image size to meet the screen size requirement through the zoom operation of the lens, however, compared with the fixed focus lens, the zoom projection lens has more and more complex lens structures, and the volume is also larger, fixed-focus lenses still have the advantages of miniaturization and lightweight.

In order to achieve the required projection imaging quality, conventional fixed focus lenses usually adopt a design of multiple lens groups or multiple aspherical lenses, but this also sacrifices the advantages of miniaturization and lightweight of fixed focus lenses; therefore, how to maintain the advantages of miniaturization and lightweight of a fixed focus lens while also taking into account the quality of projection imaging and adjusting the projection configuration to an optimal level is the goal of the present invention.

SUMMARY OF THE INVENTION

A primary objective of the present invention is to reduce the number of the lens group and the aspherical lense, and maintain the quality of projection imaging.

To achieve the objects mentioned above, the present invention from the magnifying side to the narrowing side of the lens sequentially comprising: a front lens group and a rear lens group, the front lens group has 8 to 11 lenses, the front lens group has a front aspherical lens, the rear lens group has 8 to 11 lenses, the rear lens group has a rear aspherical lens, for satisfying $1.5<|fa/f|<3$ and $4<Bf/f<5$, f is the focal length of the system, fa is the focal length of the front lens group from the first lens to the fifth lens, Bf is the rear focal length obtained by air conversion, the rear lens group has an aperture.

Also, the front aspherical lens is arranged at the fourth lens, the fifth lens or the sixth lens from the magnifying side to the narrowing side of the lens, wherein the front aspherical lens is made of glass and has negative diopter, and the rear aspherical lens is made of glass and has positive diopter.

Also, the fixed focus projection lens complies with $10<CA1/IH<12$, CA1 is the effective aperture of the first lens closest to the magnifying side of the lens, and IH is the maximum image height on the narrowing side of the lens; the fixed focus projection lens complies with $4.1<CAm/IH<5.9$, CAm is the effective aperture of the front aspherical lens, and IH is the maximum image height on the narrowing side of the lens; the fixed focus projection lens complies with $6.5<CAm/f<9.2$, CAm is the effective aperture of the front aspherical lens.

Also, the first positive diopter lens of the front lens group from the magnifying side to the narrowing side of the lens has a refractive rate>1.75 and an Abbe number<50, the effective aperture value of this projection lens is >=2.0.

DETAILED DESCRIPTION OF THE PREFERRED EMBODIMENT

Figure 1A:
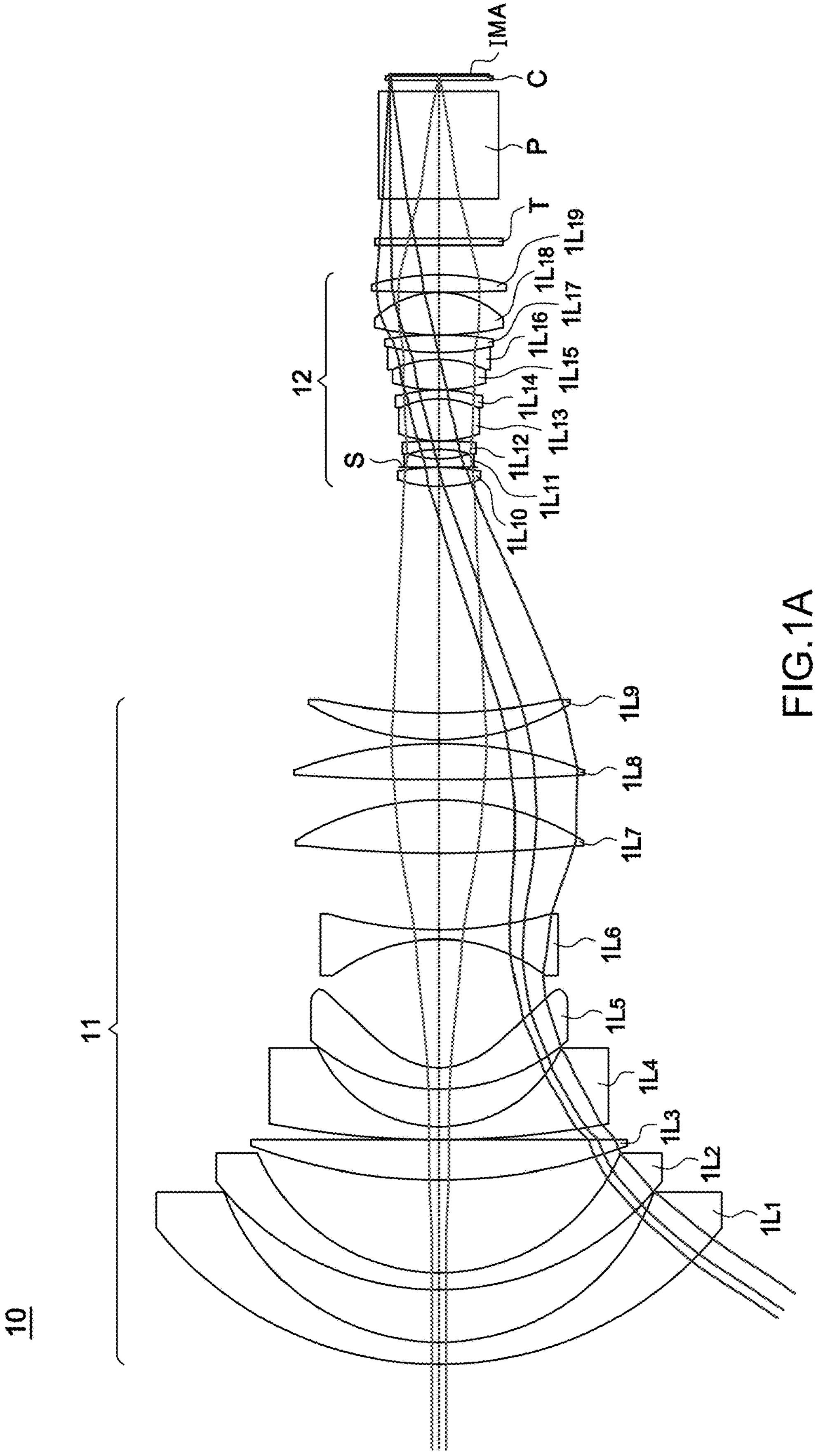
FIG. 1A is a schematic diagram illustrating lenses arrangement of the first embodiment of the present invention.

Referring to FIG. 1A, the fixed focus projection lens 10 the first embodiment of the present invention includes a front lens group 11, a rear lens group 12 and a transmissive smooth picture actuator T, then a prism P, a cover glass C and an image source IMA are sequentially provided behind the transmissive smooth picture actuator T; in sequence from the magnifying side to the narrowing side, the front lens group 11 has a first lens 1L1, a second lens 1L2, a third lens 1L3, a fourth lens 1L4, a fifth lens 1L5, and a sixth lens 1L6, a seventh lens 1L7, an eighth lens 1L8 and a ninth lens 1L9; in sequence from the magnifying side to the narrowing side, the rear lens group 12 has a tenth lens 1L10, an aperture S, an eleventh lens 1L11, a twelfth lens 1L12, a thirteenth lens 1L13, a fourteenth lens 1L14, a fifteenth lens 1L15, a sixteenth lens 1L16, a seventeenth lens 1L17, an eighteenth lens 1L18 and a nineteenth lens 1L19, the aperture S has the effective aperture value of this projection lens is >=2.0, the focal length of the system (f) is 9.2, the focal length (fa) of the first to fifth lenses of the front lens group 11 is −23.2, the rear focal length (Bf) obtained by air conversion is 44.34, $|fa/f|=2.5$, $Bf/f=4.82$, which is consistent with $1.5<|fa/f|<3$ and $4<Bf/f<5$.

The front lens group 11 has a front aspherical lens, which is arranged at the fourth lens and the fifth lens or the sixth lens from the magnifying side to the narrowing side (the front aspherical lens of embodiment 1 is the fifth lens 1L5), the front aspherical lens is made of glass and has negative diopter, and the rear lens group 12 has a rear aspherical lens, which is made of glass and has positive diopter.

The first lens of the fixed focus projection lens 10 closest to the magnifying side of the lens (first lens 1L1) has the effective aperture (CA1) 161.2, the maximum image height (IH) on the narrowing side is 14.5, the effective aperture (CAm) of the front aspherical lens (fifth lens 1L5) is 72.1, the system focal length (f) is 9.2, $CA1/IH=11.1$, $CAm/IH=5.0$, $CAm/f=7.8$, consistent with $10<CA1/IH<12$, $4.1<CAm/IH<5.9$ and $6.5<CAm/f<9.2$; also, from the magnifying side to the narrowing side of the front lens group 11 has a first positive diopter lens (the third lens 1L3) having a refractive rate (nd)=1.85 and an Abbe number (vd)=23.8, which is consistent with a refractive rate>1.75 and an Abbe number<50.

The lens design parameters of the fixed focus projection lenses 10 is as shown in Table 1A and Table 1B; wherein, 1L1R1 is the magnifying side surface (R1) of the first lens (1L1), and 1L1R2 is the narrowing source side surface (R2) of the first lens (1L1), 1L2R1 is the magnifying side surface (R1) of the second lens (1L2), 1L2R2 is the narrowing source side surface (R2) of the second lens (1L2), . . . 1L19R1 is the magnifying side surface (R1) of the nineteenth lens (1L19), 1L19R2 is the magnifying source side surface (R2) of the nineteenth lens (1L19), and so on.

TABLE 1A

| | Radius | Thickness | Nd | Vd |
|---|---|---|---|---|
| 1L1R1 | 109.74 | 6.00 | 1.85 | 23.8 |
| 1L1R2 | 69.05 | 14.88 | | |
| 1L2R1 | 86.58 | 4.50 | 1.77 | 49.6 |
| 1L2R2 | 59.35 | 26.04 | | |
| 1L3R1 | 168.19 | 11.24 | 1.85 | 23.8 |
| 1L3R2 | Infinity | 0.20 | | |
| 1L4R1 | 301.33 | 3.50 | 1.59 | 68.3 |
| 1L4R2 | 40.70 | 10.39 | | |
| 1L5R1 | 79.07 | 6.00 | 1.52 | 64.0 |
| 1L5R2 | 22.04 | 35.90 | | |
| 1L6R1 | −53.45 | 2.65 | 1.44 | 94.6 |
| 1L6R2 | 126.57 | 21.40 | | |
| 1L7R1 | 409.39 | 14.74 | 1.52 | 58.7 |
| 1L7R2 | −86.22 | 5.59 | | |
| 1L8R1 | 627.79 | 10.36 | 1.58 | 40.7 |
| 1L8R2 | −124.43 | 1.00 | | |
| 1L9R1 | 80.96 | 7.54 | 1.62 | 36.3 |
| 1L9R2 | 187.72 | 63.26 | | |
| 1L10R1 | 43.30 | 4.83 | 1.52 | 64.0 |
| 1L10R2 | −93.32 | 0.20 | | |
| STOP | Infinity | 0.20 | | |
| 1L11R1 | Infinity | 2.20 | 1.83 | 42.7 |
| 1L11R2 | 35.69 | 2.59 | | |
| 1L12R1 | −39.19 | 2.20 | 1.91 | 35.3 |
| 1L12R2 | −226.01 | 0.20 | | |
| 1L13R1 | 38.21 | 12.03 | 1.51 | 61.2 |
| 1L13R2 | −27.13 | 0.00 | | |
| 1L14R1 | −27.13 | 1.80 | 1.95 | 32.3 |
| 1L14R2 | −70.42 | 0.25 | | |
| 1L15R1 | 47.91 | 8.69 | 1.49 | 70.4 |
| 1L15R2 | −30.25 | 0.00 | | |
| 1L16R1 | −30.25 | 1.80 | 1.95 | 32.3 |
| 1L16R2 | 61.42 | 0.35 | | |
| 1L17R1 | 62.59 | 4.55 | 1.52 | 64.0 |
| 1L17R2 | −78.50 | 0.37 | | |
| 1L18R1 | 91.99 | 11.72 | 1.44 | 94.6 |
| 1L18R2 | −28.54 | 0.20 | | |
| 1L19R1 | 1377.69 | 4.83 | 1.95 | 17.9 |
| 1L19R2 | −75.73 | 0.20 | | |

TABLE 1B

| | 1L5R1 | 1L5R2 | 1L17R1 | 1L17R2 |
|---|---|---|---|---|
| Conic | −6.507855 | −1.223160 | −2.624711 | −9.109485 |
| 4th | 1.105E−05 | 1.063E−05 | −4.363E−06 | 7.935E−06 |
| 6th | −2.345E−08 | −2.623E−08 | 3.711E−09 | 1.006E−09 |
| 8th | 3.231E−11 | 3.664E−12 | −4.681E−12 | 2.464E−11 |
| 10th | −2.939E−14 | 6.447E−14 | −2.372E−13 | −3.613E−13 |
| 12th | 1.886E−17 | −1.079E−16 | 1.440E−15 | 1.264E−15 |
| 14th | −7.774E−21 | 7.327E−20 | −2.306E−18 | −1.372E−18 |
| 16th | 1.544E−24 | −1.880E−23 | 0.000E+00 | 0.000E+00 |

Figure 1B:
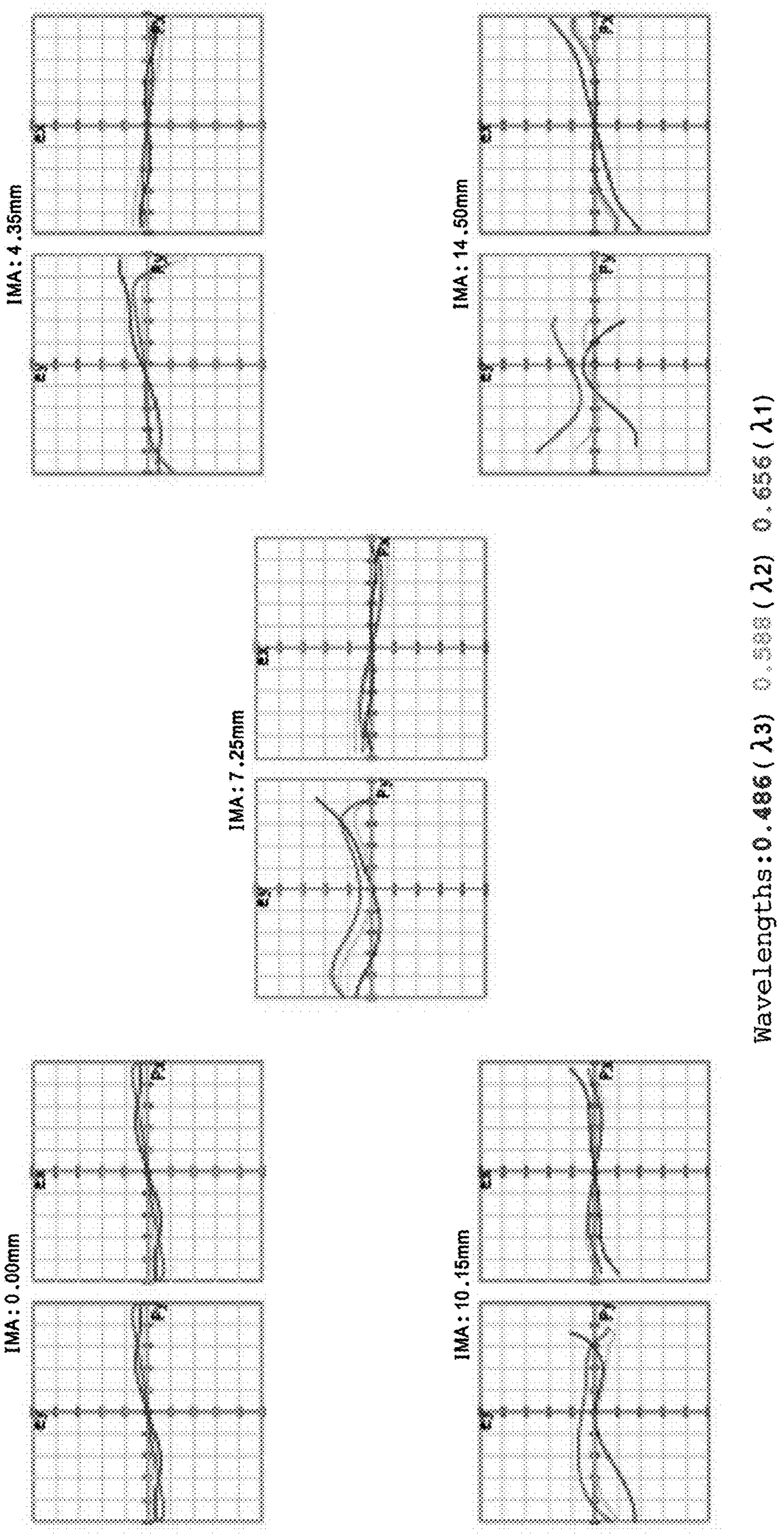
FIG. 1B is a transverse ray fan diagram of the first embodiment of the present invention.
Figure 1D:
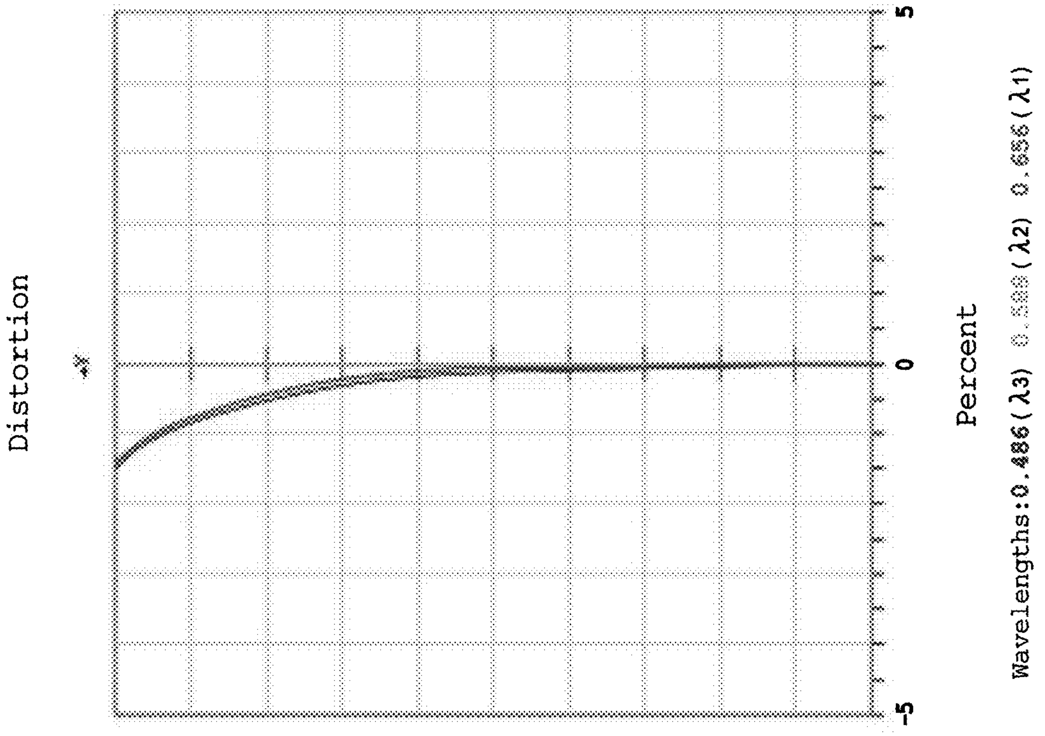
FIG. 1D is a distortion diagram of the first embodiment of the present invention.
Figure 1C:
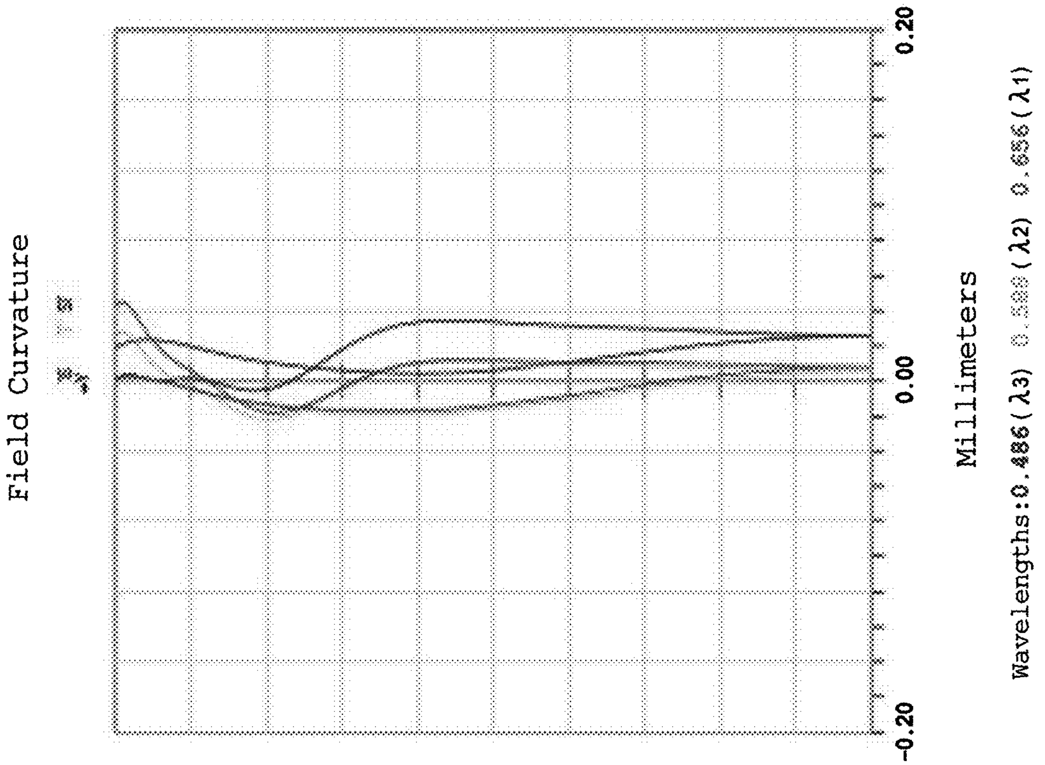
FIG. 1C is a field curve diagram of the first embodiment of the present invention.

The fixed focus projection lens 10 uses a first wavelength λ1 of 656 nm, a second wavelength λ2 of 588 nm and a third wavelength λ3 of 486 nm to simulate different transverse ray fan plot as shown in FIG. 1B, and the image source IMA presents different image heights of 0.00 mm, 4.35 mm, 7.25 mm, 10.15 mm and 14.50 mm respectively. The symbols ey, py, ex and px respectively represent the y-axis lateral aberration, y-axis pupil height, x-axis lateral aberration, x-axis pupil height, wherein maximum scale is ±20.000 um, the generated aberration value is controlled within the range of −10 um~12 um; The field curvature diagram in FIG. 1C has a maximum field of view of 57.753 degrees, curves T and S are respectively the tangential field curvature characteristic curve and the sagittal field curvature characteristic curve, the tangential field curvature value and sagittal field curvature value are controlled within the range of −0.04 mm~0.06 mm; The distortion diagram in FIG. 1D has a maximum field of view of 57.753 degrees, and the distortion amount is controlled within the range of −2.0~0%.

Figure 2A:
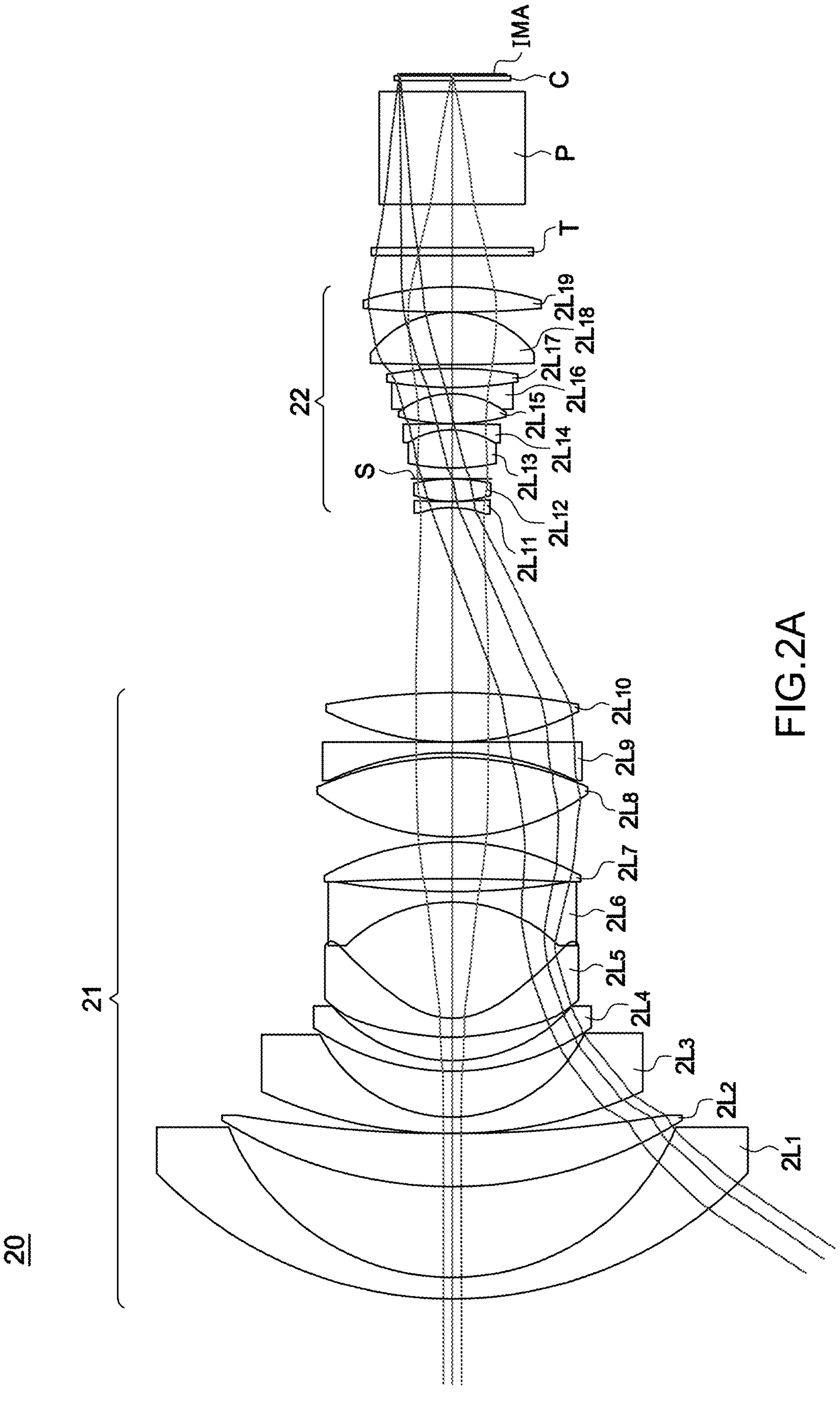
FIG. 2A is a schematic diagram illustrating lenses arrangement of the second embodiment of the present invention.

Referring to FIG. 2A, a fixed focus projection lens 20 of the second embodiment of the present invention includes a front lens group 21, a rear lens group 22 and a transmissive smooth picture actuator T, then a prism P, a cover glass C and an image source IMA are sequentially provided behind the transmissive smooth picture actuator T; in sequence from the magnifying side to the narrowing side, the front lens group 21 has a first lens 2L1, a second lens 2L2, a third lens 2L3, a fourth lens 2L4, a fifth lens 2L5, and a sixth lens 2L6, a seventh lens 2L7, an eighth lens 2L8, a ninth lens 2L9 and a tenth lens 2L10; in sequence from the magnifying side to the narrowing side, the rear lens group 22 has an eleventh lens 2L11, a twelfth lens 2L12, an aperture S, a thirteenth lens 2L13, a fourteenth lens 2L14, a fifteenth lens 2L15, a sixteenth lens 2L16, a seventeenth lens 2L17, an eighteenth lens 2L18 and a nineteenth lens 2L19, the aperture S has the effective aperture value of this projection lens is >=2.0, the focal length of the system (f) is 9.3, the focal length (fa) of the first to fifth lenses of the front lens group 21 is −19.7, the rear focal length (Bf) obtained by air conversion is 44.45, |fa/f|=2.1, Bf/f=4.78, which is consistent with 1.5<|fa/f|<3 and 4<Bf/f<5.

The front lens group 21 has a front aspherical lens, which is arranged at the fourth lens and the fifth lens or the sixth lens from the magnifying side to the narrowing side (the front aspherical lens of embodiment 2 is the fifth lens 2L5), the front aspherical lens is made of glass and has negative diopter, and the rear lens group 22 has a rear aspherical lens, which is made of glass and has positive diopter.

The first lens of the fixed focus projection lens 20 closest to the magnifying side of the lens (first lens 2L1) has the effective aperture (CA1) 158.6, the maximum image height (IH) on the narrowing side is 14.5, the effective aperture (CAm) of the front aspherical lens (fifth lens 2L5) is 66.6, the system focal length (f) is 9.3, CA1/IH=10.9, CAm/IH=4.6, CAm/f=7.2, consistent with 10<CA1/IH<12, 4.1<CAm/IH<5.9 and 6.5<CAm/f<9.2; also, from the magnifying side to the narrowing side of the front lens group 21 has a first positive diopter lens (the second lens 2L2) having a refractive rate (nd)=1.76 and an Abbe number (vd)=26.6, which is consistent with a refractive rate>1.75 and an Abbe number<50.

The lens design parameters of the fixed focus projection lenses 20 is as shown in Table 2A and Table 2B; wherein, 2L1R1 is the magnifying side surface (R1) of the first lens (2L1), and 2L1R2 is the narrowing source side surface (R2) of the first lens (2L1), 2L2R1 is the magnifying side surface (R1) of the second lens (2L2), 2L2R2 is the narrowing source side surface (R2) of the second lens (2L2), . . . 2L19R1 is the magnifying side surface (R1) of the nineteenth lens (2L19), 2L19R2 is the magnifying source side surface (R2) of the nineteenth lens (2L19), and so on.

TABLE 2A

| | Radius | Thickness | Nd | Vd |
|---|---|---|---|---|
| 2L1R1 | 117.56 | 5.60 | 1.83 | 42.7 |
| 2L1R2 | 68.14 | 23.90 | | |
| 2L2R1 | 124.94 | 14.18 | 1.76 | 26.6 |
| 2L2R2 | 407.65 | 0.20 | | |
| 2L3R1 | 138.03 | 3.80 | 1.83 | 42.7 |
| 2L3R2 | 41.71 | 12.15 | | |
| 2L4R1 | 69.93 | 2.81 | 1.83 | 42.7 |
| 2L4R2 | 46.39 | 6.15 | | |
| 2L5R1 | 88.53 | 5.11 | 1.52 | 64.1 |
| 2L5R2 | 20.62 | 30.37 | | |
| 2L6R1 | −43.24 | 2.56 | 1.50 | 81.6 |
| 2L6R2 | 217.64 | 3.56 | | |
| 2L7R1 | −733.94 | 9.64 | 1.81 | 25.5 |
| 2L7R2 | −76.26 | 1.35 | | |
| 2L8R1 | 67.31 | 20.84 | 1.65 | 33.9 |
| 2L8R2 | −92.14 | 1.35 | | |
| 2L9R1 | −81.93 | 2.61 | 1.92 | 20.9 |
| 2L9R2 | 87675.28 | 0.20 | | |
| 2L10R1 | 82.36 | 12.74 | 1.60 | 38.0 |
| 2L10R2 | −209.56 | 48.69 | | |
| 2L11R1 | −31.96 | 1.40 | 1.80 | 46.6 |
| 2L11R2 | 85.35 | 0.20 | | |
| 2L12R1 | 38.90 | 5.79 | 1.69 | 31.2 |
| 2L12R2 | −70.36 | 0.20 | | |
| STOP | Infinity | 2.75 | | |
| 2L13R1 | 73.92 | 10.00 | 1.49 | 70.4 |
| 2L13R2 | −21.65 | 0.20 | | |
| 2L14R1 | −21.41 | 1.35 | 1.85 | 32.3 |
| 2L14R2 | −1449.14 | 0.20 | | |
| 2L15R1 | 60.78 | 7.70 | 1.50 | 81.6 |
| 2L15R2 | −24.68 | 0.20 | | |
| 2L16R1 | −26.12 | 1.40 | 2.00 | 25.4 |
| 2L16R2 | 113.64 | 0.21 | | |
| 2L17R1 | 122.92 | 4.79 | 1.61 | 57.9 |
| 2L17R2 | −52.94 | 0.94 | | |
| 2L18R1 | 323.70 | 13.93 | 1.50 | 81.6 |
| 2L18R2 | −28.89 | 0.20 | | |
| 2L19R1 | 355.51 | 6.45 | 1.95 | 17.9 |
| 2L19R2 | −78.59 | 0.20 | | |

TABLE 2B

| | 2L5R1 | 2L5R2 | 2L17R2 |
|---|---|---|---|
| Conic | 0 | −2.862119 | −5.470618 |
| 4th | 5.260E−06 | 2.585E−05 | 8.044E−06 |
| 6th | −2.119E−08 | −8.047E−08 | 1.330E−08 |
| 8th | 4.163E−11 | 1.592E−10 | −9.537E−12 |
| 10th | −4.442E−14 | −1.973E−13 | −3.778E−14 |
| 12th | 2.750E−17 | 1.446E−16 | 4.867E−17 |
| 14th | −8.618E−21 | −5.264E−20 | 0.000E+00 |
| 16th | 1.014E−24 | 5.272E−24 | 0.000E+00 |

Figure 2B:
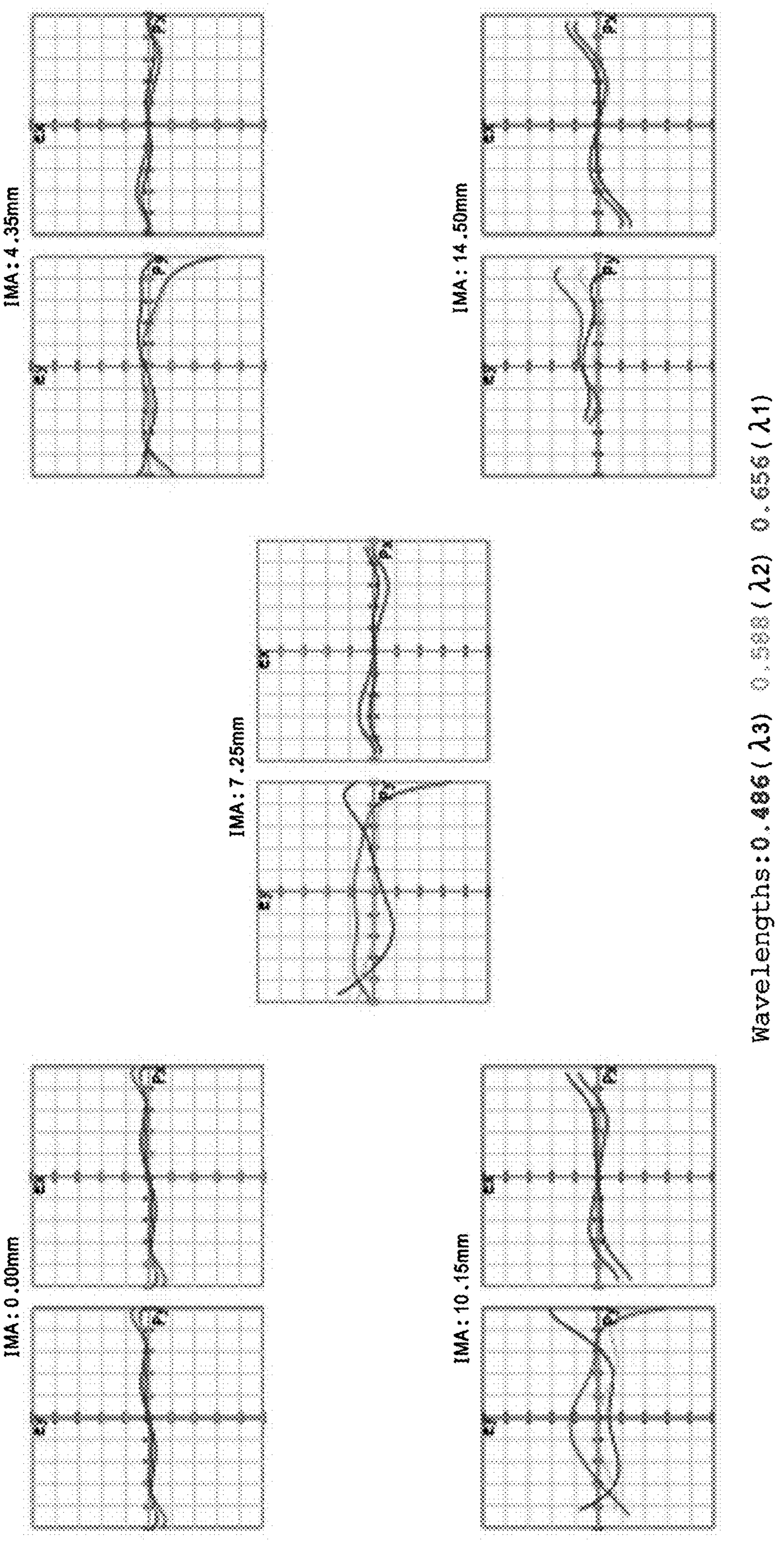
FIG. 2B is a transverse ray fan diagram of the second embodiment of the present invention.
Figure 2C:
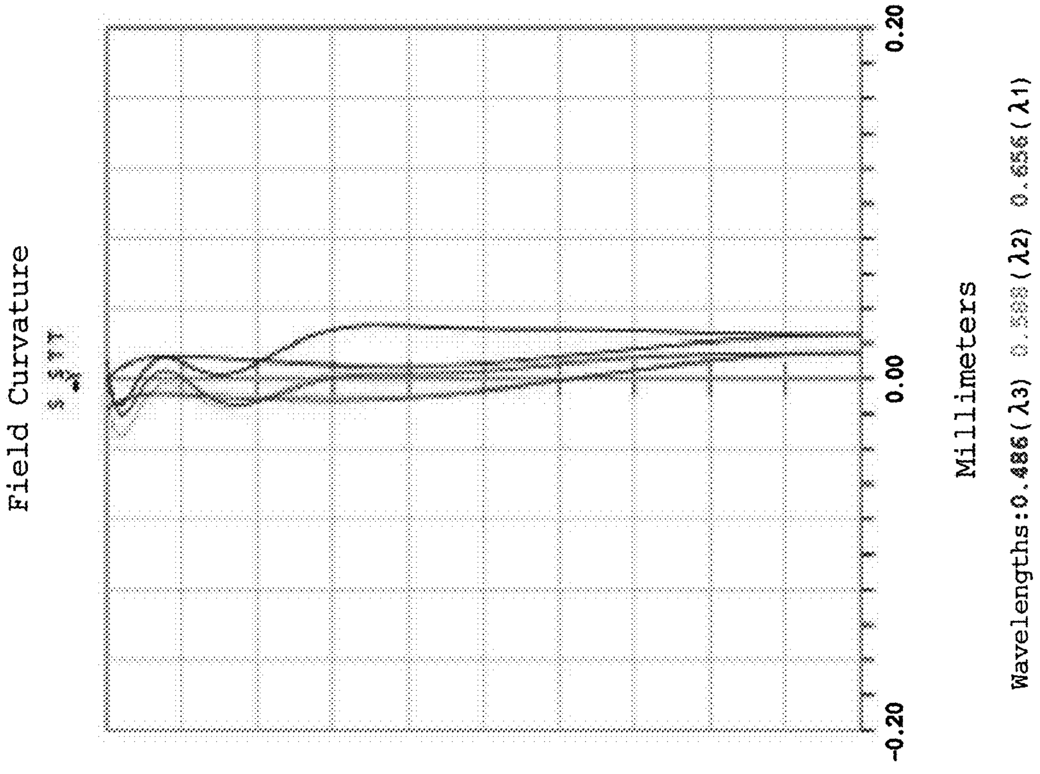
FIG. 2C is a field curve diagram of the second embodiment of the present invention.
Figure 2D:
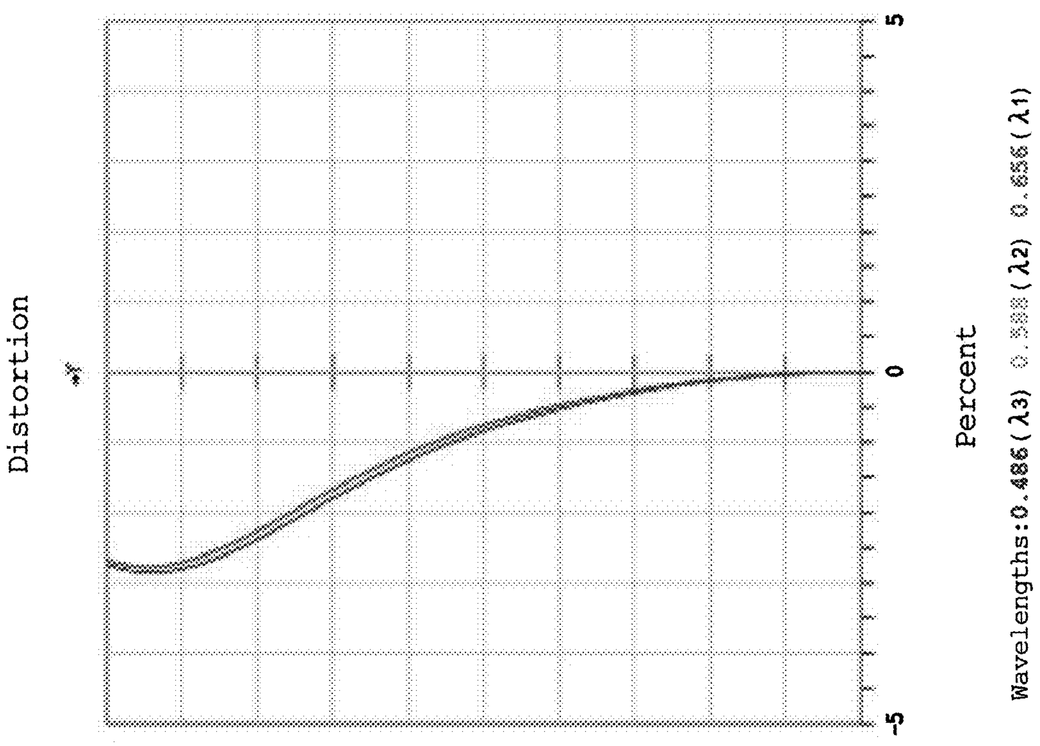
FIG. 2D is a distortion diagram of the second embodiment of the present invention.

The fixed focus projection lens 20 uses a first wavelength λ1 of 656 nm, a second wavelength λ2 of 588 nm and a third wavelength λ3 of 486 nm to simulate different transverse ray fan plot as shown in FIG. 2B, and the image source IMA presents different image heights of 0.00 mm, 4.35 mm, 7.25 mm, 10.15 mm and 14.50 mm respectively. The symbols ey, py, ex and px respectively represent the y-axis lateral aberration, y-axis pupil height, x-axis lateral aberration, x-axis pupil height, wherein maximum scale is ±20.000 um, the generated aberration value is controlled within the range of −16 um~12 um; The field curvature diagram in FIG. 2C has a maximum field of view of 57.907 degrees, curves T and S are respectively the tangential field curvature characteristic curve and the sagittal field curvature characteristic curve, the tangential field curvature value and sagittal field curvature value are controlled within the range of −0.04 mm~0.04 mm; The distortion diagram in FIG. 2D has a maximum field of view of 57.907 degrees, and the distortion amount is controlled within the range of −3.0~0%.

With the feature disclosed above, the present invention satisfies requirement of miniaturization and lightweight of a fixed focus lens, and making the aberration, longitudinal spherical aberration, field curvature and distortion of the fixed focus projection lenses 10 and 20 can be controlled within a smaller range; therefore, the present invention meet the projection requirements of reducing the number of the lens group and the aspherical lense, and maintaining the quality of projection imaging.

Although particular embodiment of the invention has been described in detail for purposes of illustration, various modifications and enhancements may be made without departing from the spirit and scope of the invention. Accordingly, the invention is not to be limited except by the appended claims.

What is claimed is:

1. A fixed focus projection lens, from the magnifying side to the narrowing side of the lens sequentially comprising: a front lens group and a rear lens group, the front lens group has 8 to 11 lenses, the front lens group has a front aspherical lens, the rear lens group has 8 to 11 lenses, the rear lens group has a rear aspherical lens, for satisfying $1.5<|fa/f|<3$ and $4<Bf/f<5$, f is the focal length of the system, fa is the focal length of the front lens group from the first lens to the fifth lens, Bf is the rear focal length obtained by air conversion, the rear lens group has an aperture.

2. The fixed focus projection lens as claimed in claim 1, wherein the front aspherical lens is arranged at the fourth lens, the fifth lens or the sixth lens from the magnifying side to the narrowing side of the lens.

3. The fixed focus projection lens as claimed in claim 1, wherein the front aspherical lens is made of glass and has negative diopter, and the rear aspherical lens is made of glass and has positive diopter.

4. The fixed focus projection lens as claimed in claim 1, wherein the fixed focus projection lens complies with $10<CA1/IH<12$, CA1 is the effective aperture of the first lens closest to the magnifying side of the lens, and IH is the maximum image height on the narrowing side of the lens.

5. The fixed focus projection lens as claimed in claim 1, wherein the fixed focus projection lens complies with $4.1<CAm/IH<5.9$, CAm is the effective aperture of the front aspherical lens, and IH is the maximum image height on the narrowing side of the lens.

6. The fixed focus projection lens as claimed in claim 1, wherein the fixed focus projection lens complies with $6.5<CAm/f<9.2$, CAm is the effective aperture of the front aspherical lens.

7. The fixed focus projection lens as claimed in claim 1, wherein the first positive diopter lens of the front lens group from the magnifying side to the narrowing side of the lens has a refractive rate>1.75 and an Abbe number<50.

8. The fixed focus projection lens as claimed in claim 7, wherein the effective aperture value of this projection lens is >=2.0.

* * * * *